(12) United States Patent
Iliev et al.

(10) Patent No.: US 11,194,311 B1
(45) Date of Patent: Dec. 7, 2021

(54) RAPID PRODUCT DESIGN OF IMPROVED BALLISTIC ARTICLES

(71) Applicants: Vall A. Iliev, Stow, OH (US); Martin Iliev, Stow, OH (US)

(72) Inventors: Vall A. Iliev, Stow, OH (US); Martin Iliev, Stow, OH (US)

(73) Assignee: SHOT STOP BALLISTICS LLC, Stow, OH (US)

( * ) Notice: Subject to any disclaimer, the term of this patent is extended or adjusted under 35 U.S.C. 154(b) by 0 days.

(21) Appl. No.: 16/115,614

(22) Filed: Aug. 29, 2018

Related U.S. Application Data

(63) Continuation-in-part of application No. 15/335,216, filed on Oct. 26, 2016, now Pat. No. 10,082,372, and a continuation-in-part of application No. 15/335,196, filed on Oct. 26, 2016, now Pat. No. 10,048,046.

(60) Provisional application No. 62/554,537, filed on Sep. 5, 2017.

(51) Int. Cl.
| | |
|---|---|
| *F41H 5/02* | (2006.01) |
| *G05B 19/4099* | (2006.01) |
| *G01N 3/00* | (2006.01) |
| *G01N 9/00* | (2006.01) |

(52) U.S. Cl.
CPC .......... *G05B 19/4099* (2013.01); *F41H 5/02* (2013.01); *G01N 3/00* (2013.01); *G01N 9/00* (2013.01); *G05B 2219/49007* (2013.01)

(58) Field of Classification Search
CPC ....................................................... G01N 3/00
USPC .......................................................... 428/105
See application file for complete search history.

(56) References Cited

U.S. PATENT DOCUMENTS

| | | | |
|---|---|---|---|
| 2005/0005670 A1* | 1/2005 | Durney ................... | B21D 5/00 72/379.2 |
| 2013/0096887 A1* | 4/2013 | Fee ....................... | G06F 17/5009 703/1 |
| 2016/0318255 A1* | 11/2016 | Ou ...................... | G05B 19/4099 |

* cited by examiner

*Primary Examiner* — Brent T O'Hern
(74) *Attorney, Agent, or Firm* — Gugliotta & Gugliotta LPA

(57) ABSTRACT

A method for the design and development of new ballistic resistant articles is provided. Improved ballistic articles are formed of polyethylene-based composite laminated structures having unique material properties including material density, Poisson's ratio, and modulus of elasticity (Young's modulus). Cycle time for completing design and development is less than 30 calendar days.

2 Claims, 3 Drawing Sheets

RAPID PRODUCT DESIGN OF IMPROVED BALLISTIC ARTICLES

RELATED APPLICATIONS

The present application claims benefit of U.S. Provisional Application 62/554,537, filed Sep. 5, 2017 and incorporated by reference as if fully rewritten herein.

The present invention is also a Continuation in Part application of U.S. Ser. No. 15/335,196 filed on Oct. 26, 2016 and subsequently issued as U.S. Pat. No. 10,048,046, and a Continuation in Part of U.S. Ser. No. 15/335,216 also filed on Oct. 26, 2016 and subsequently issued as U.S. Pat. No. 10,082,372, all of which are incorporated by reference as if fully rewritten herein.

BACKGROUND OF THE INVENTION

1. Field of the Invention

The present invention relates to improved ballistic resistant articles and, more particularly, to an improved method for the design and development of new ballistic resistant articles utilized the materials described in U.S. Ser. No. 15/335,196 filed on Oct. 26, 2016 and issued as U.S. Pat. No. 10,048,046 and U.S. Ser. No. 15/335,216 also filed on Oct. 26, 2016 and issued as U.S. Pat. No. 10,082,372.

2. Description of the Related Art

Improvements in ballistic materials have been previously discovered by the present inventor that result in production of lighter weight, less expensive materials. Along with the maintenance of ballistic resistant performance with such improvements were derived a variety of designs for devices that emulate existing anti-ballistic applications in a more commercially competitive manner. However, along with lighter weight, less expense and the variety of other improvements that exist, in the identification of these benefits by the marketplace a previously unanticipated demand was created for the implementation of such materials into an eclectic group of new and different products.

Traditionally, the design and development of new anti-ballistic materials into new articles is an iterative time and labor consuming process. Given the potentially lifesaving nature of the finished article extensive destructive testing with live ammunition must be performed prior to putting human users into harm's way. However, with the end user need generally being expressed as urgent by security or safety first responders (i.e., military, police, etc.), along with much of such procurement being performed on a multi-year cycle, a need exists for decreasing the development cycle between the identification of a new ballistic device through testing approval through commercial viability.

Consequently a need exists for a system and method for the rapid design and implementation of new or improved ballistic articles.

SUMMARY OF THE INVENTION

It is thus an object of the present invention to provide a method for the rapid design of new or improved ballistic articles.

It is a further object of the present invention to provide a method for the rapid development through commercial launch of such newly designed or improved ballistic articles.

According to a preferred embodiment of the present invention, ballistics failure analyses with CAE (Computer Aided Engineering) its used to initially solve performance challenges in the development of new armor projects. When designing a ballistics solution for body armor or other applications, there are many aspects that can be utilized to achieve a desired level of protection. According to one aspect of the present invention an existing, prior art solution is utilized as a starting point for design development, with dimensions and features emulated as closely as possible utilizing the materials and production methods described by or anticipated in the inventor's own previous innovations as described in the related prior applications U.S. Ser. No. 15/335,196 (and now U.S. Pat. No. 10,048,046) and U.S. Ser. No. 15/335,216 and now U.S. Pat. No. 10,082,372. Such alpha stage prototypes are then physically tested to see if the desired results are achieved. Given the improvements of the materials used and differences and limitations caused by necessary methods of manufacture, iteration of the process will likely be necessary in order to maximize the benefits polyethylene-based composite laminated structures.

According to another aspect of the present invention, initial product prototyping may be develop based on calculated calculating strength and performance and verifying with destructive physically testing.

While improved product design and implementation may be achieved by such methods, both of the above methods are prone to inefficiencies, through errors in calculation or implementation, the need for multiple tests, the reliance on an intangible of 'experience' to know when to cease iterations, and the time or expense associated with potentially unnecessary rounds of destructive testing.

According to yet another aspect of the preferred embodiment of the present invention, the ballistics solution is initially implemented using a modern Computer Aided Design (CAD) program. There are several programs available with varying features and price points, and they also include basic simulation with more advanced simulation available as an add-in. As necessary, which has been found to be less often than not the CAD model can be imported onto a stand-alone simulation application. In a majority of the applications, modifications to the material properties must be corrected in and be applied to the CAD model based upon, inter alia: material density; Poisson's ratio; and modulus of elasticity (Young's modulus). If these properties are incorrectly entered, the product may not perform as expected even though the simulation may indicate otherwise.

According to a preferred aspect of the present invention, it is best practice to run a basic simulation early in the design process. This will provide insight in product weight, indicate if the specified material is suitable, and identify areas that do not meet a selected, desired or specified factor of safety. If the simulation fails or the product is too heavy, other materials and thickness may be tested.

According to such a method it is possible to test several design iterations without expensive prototypes and physical testing.

Once a completed design passes the basic simulation test t may be desirable to use advanced simulation. This can identify areas where less material may be used or other areas that may reduce production costs, as well as identifying possible performance issues not seen with basic simulation. This information can be used to produce a high performing product at the lowest possible cost, benefiting the manufacturer and the consumer.

An advantage of the present invention is the significant decrease of the time for development of improved ballistic resistant articles.

Further objects, features and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Figure 1:
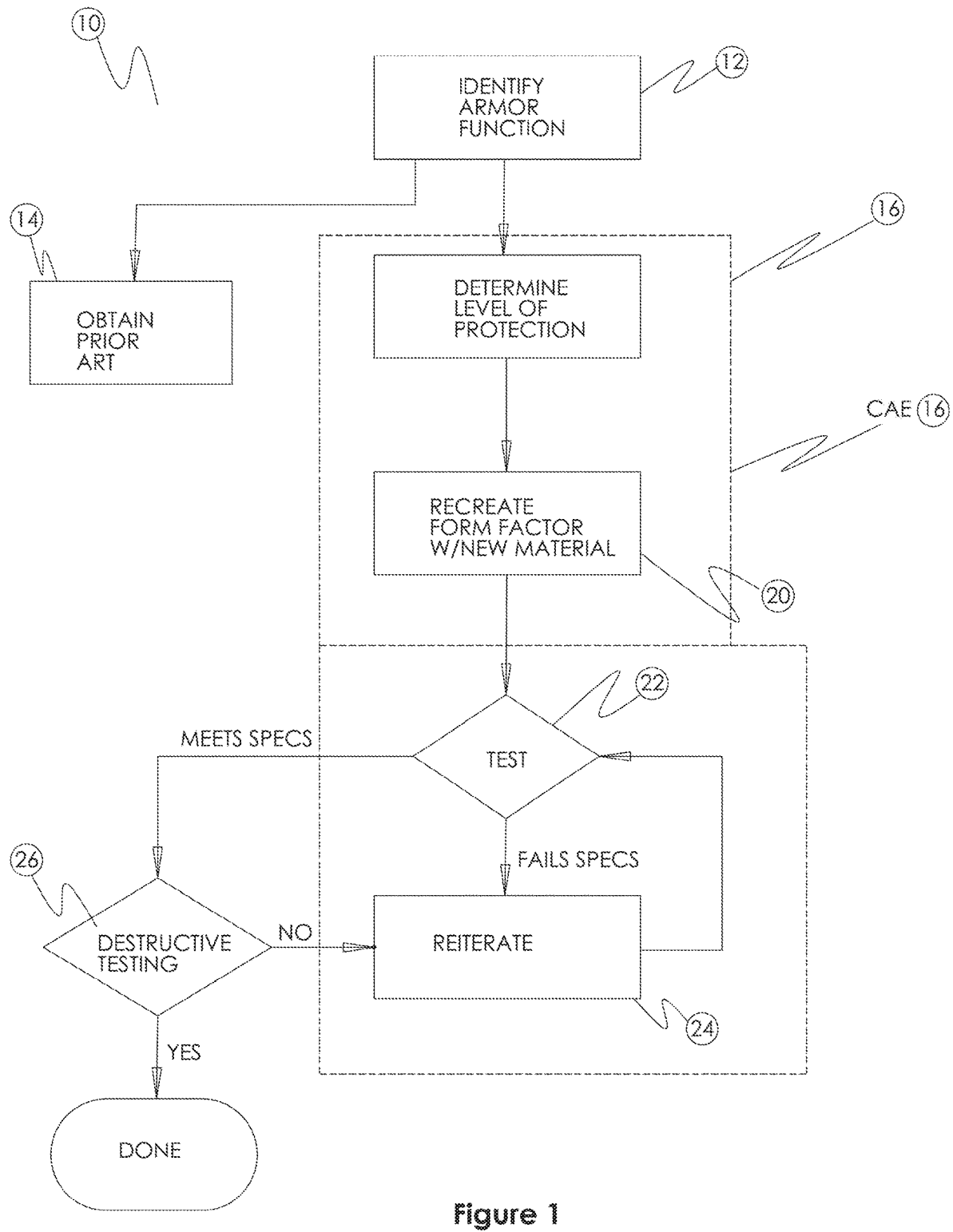
FIG. 1 is a process flow diagram for a method of rapid new product development according to a first aspect of the preferred embodiment of the present invention.

Referring now to FIG. 1, a method for the rapid development through commercial launch of such newly designed or improved ballistic articles is shown according to a first aspect of the preferred embodiment of the present invention. According to the first aspect of the preferred method 10, a new armor function 12 is identified and a competitive, prior art specimen 14 is obtained and used to create an initial product design with CAE (Computer Aided Engineering) 16. Utilizing the prior art specimens as a starting point for design development, dimensions and features emulated as closely as possible utilizing the materials and production methods described by or anticipated in the inventor's own previous innovations as described in related prior applications U.S. Ser. No. 15/335,196 (subsequently issued as U.S. Pat. No. 10,048,046), U.S. Ser. No. 15/335,216 (subsequently issued as U.S. Pat. No. 10,082,372). With consideration for what level of ballistic protection is required 18 an alpha stage prototype is thereby created 20. The alpha stage prototype is thereafter physically tested 22 to determine if the desired product performance results are achieved.

If CAE testing appears to fail the performance specification, the design in successively improved and reiterated 24. If the CAE test in appears to meet performance specifications, a physical prototype is destructively tested 26, with failures reiterated back to the CAE program. Passage of the destructive testing results in a completed design.

Figure 2:
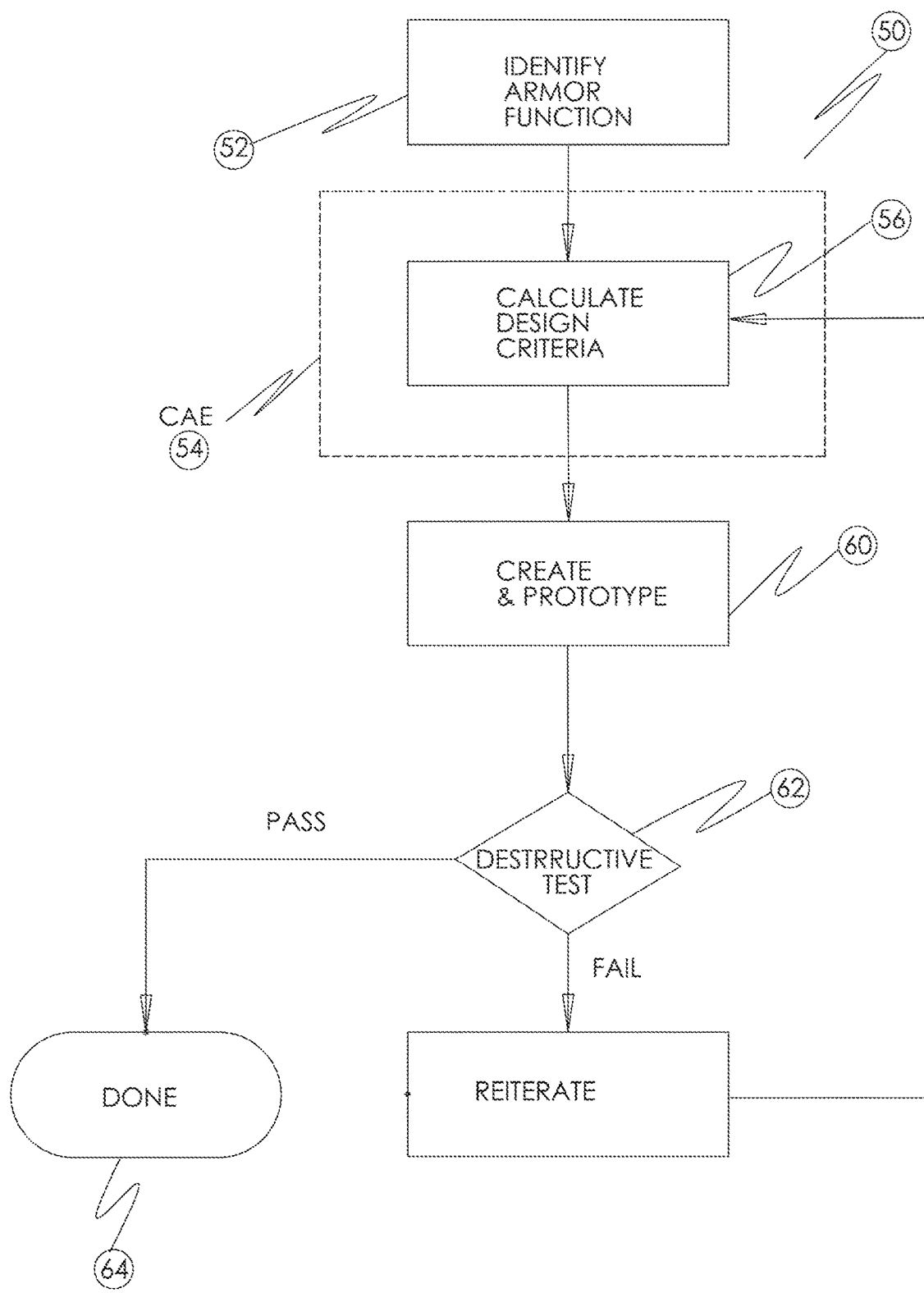
FIG. 2 is a process flow diagram for a method of rapid new product development according to a second aspect of the preferred embodiment of the present invention.

Referring now to FIG. 2, a method for the rapid development through commercial launch of such newly designed or improved ballistic articles is shown according to a second aspect of the preferred embodiment of the present invention. According to second aspect of the preferred method 50, a new armor function 52 and an initial product design is created with CAE (Computer Aided Engineering) 54 from calculated design criteria 56. Calculations for the design criteria 56 are performed in consideration of the improvements of the materials used and differences and limitations caused by necessary methods of manufacture. An initial (alpha)-prototype is created 60, and destructive testing is performed 62, with failures reiterated back to the CAE program. Passage of the destructive testing results in a completed design 64.

Figure 3:
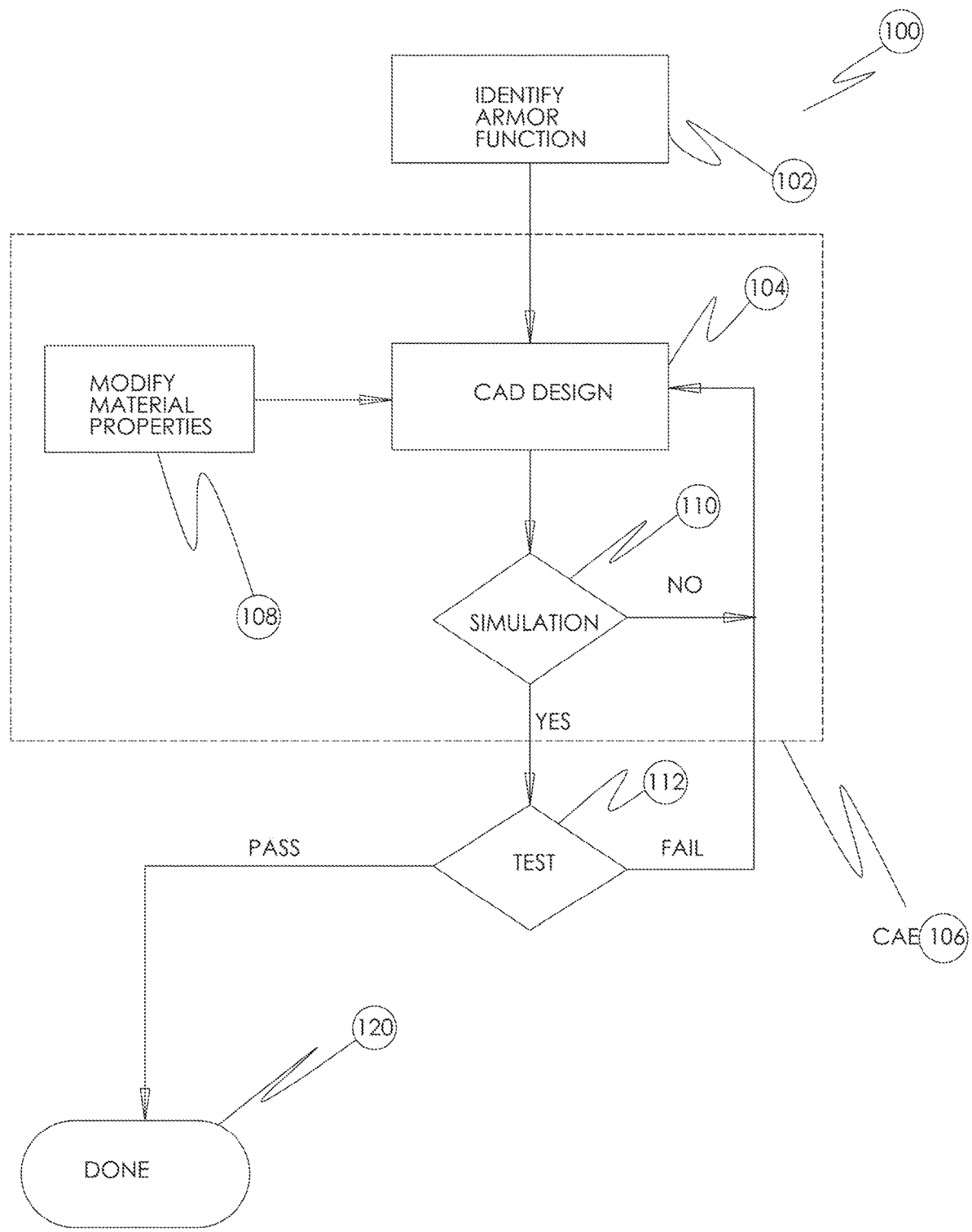
FIG. 3 is a process flow diagram for a method of rapid new product development according to a third aspect of the preferred embodiment of the present invention.

Referring now to FIG. 3, a method for the rapid development through commercial launch of such newly designed or improved ballistic articles is shown according to a third aspect of the preferred embodiment of the present invention. According to second aspect of the preferred method 100, a new armor function 102 and an initial product design 104 is created with CAE (Computer Aided Engineering) 106. There are several programs available with varying features and price points, and they also include basic simulation with more advanced simulation available as an add-in. As necessary, which has been found to be less often than not the CAD model can be imported onto a stand-alone simulation application. In a majority of the applications, modifications to the material properties 108 must be corrected in and be applied to the CAD model based upon, inter glia: material density; Poisson's ratio; and modulus of elasticity (Young's modulus). If these properties are incorrectly entered, the product may not perform as expected even though the simulation may indicate otherwise.

An initial performance simulation 110 is performed within the CAE program, with failing virtual results leading to virtual design iteration and passing virtual results leading to the creating of a physical prototype for destructive testing 112. Subsequent destructive testing 112 results in failing designs leading to reiteration, with passing results leading to a completed design 120.

2. Operation of the Preferred Embodiment

In operation, the present method of rapid new product development is provided for anti-ballistic articles according to the preferred embodiment of the present invention. New armored products, or newly designed and improved armor products, can hereby be developed with significant decrease of the time for development of improved ballistic resistant articles. Using such methods maximize the benefits polyethylene-based composite laminated structures for new armored products in such a manner as to provide for complete ideation, development, experimentation, testing and finalization in short overall window, such as, inter Alia, within a 30 day project window.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter. Further, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

What is claimed is:

1. A method for a rapid design of improved ballistic articles comprising, in combination:
    identifying new armor products or existing armor products to be improved upon;
    creating a 3D engineering model utilizing ballistics failure analyses with a CAE (Computer Aided Engineering) program utilizing an anti-ballistic material comprising:
        interlineated layers of modified polyethylene materials; and
        layers of carbon nanotubes between adjacent modified polyethylene materials layers, wherein each said interlineated layer of modified polyethylene material is formed having a molecularly oriented layer of material;
    iteratively testing said 3D engineering model until a suggested design is achieved to meet a selected specification;
    creating a physical prototype of said suggested design; and
    destructively testing said physical prototype to confirm if the selected specification is achieved;
wherein the CAE (Computer Aided Engineering) program is utilized with the 3D engineering model imported into a stand-alone simulation application for said iterative testing of the 3D engineering model to modify material properties selected from a group comprising: material density; Poisson's ratio; and modulus of elasticity (Young's modulus).

2. A method for the rapid design of improved ballistic articles comprising, in combination:
    identifying new armor products or existing armor products to be improved upon;
    creating a 3D engineering model utilizing ballistics failure analyses with a CAE (Computer Aided Engineering) program utilizing an anti-ballistic material comprising:
        interlineated layers of modified polyethylene materials; and
        layers of carbon nanotubes between adjacent modified polyethylene materials layers, wherein each said interlineated layer of modified polyethylene material is formed having a molecularly oriented layer of material;
    iteratively testing said 3D engineering model until a suggested design is achieved to meet a selected specification;
    creating a physical prototype of said suggested design; and
    destructively testing said physical prototype to confirm if are the selected specification is achieved;
wherein a cycle time for completing said combination is less than 30 calendar days;
wherein prior art specimens are utilized as a starting point for design development, dimensions and features emulated as closely as possible; and
wherein the commercial CAE (Computer Aided Engineering) program is utilized with the 3D engineering model imported into a stand-alone simulation application for said iterative testing of the 3D engineering model to modify material properties selected from a group comprising: material density; Poisson's ratio; and modulus of elasticity (Young's modulus).

* * * * *